(No Model.)  W. THOMSON.  3 Sheets—Sheet 1.
GALVANOMETER.

No. 416,655.  Patented Dec. 3, 1889.

Attest.
E. Arthur
Geo. S. Wheelock

Inventor
William Thomson
By Knight & Bro.
Atty (No Model.) 3 Sheets—Sheet 2.

W. THOMSON.
GALVANOMETER.

No. 416,655. Patented Dec. 3, 1889.

Attest
E. Arthur
Geo. S. Wheelock

Inventor
William Thomson
By Knight Bros.
Attys

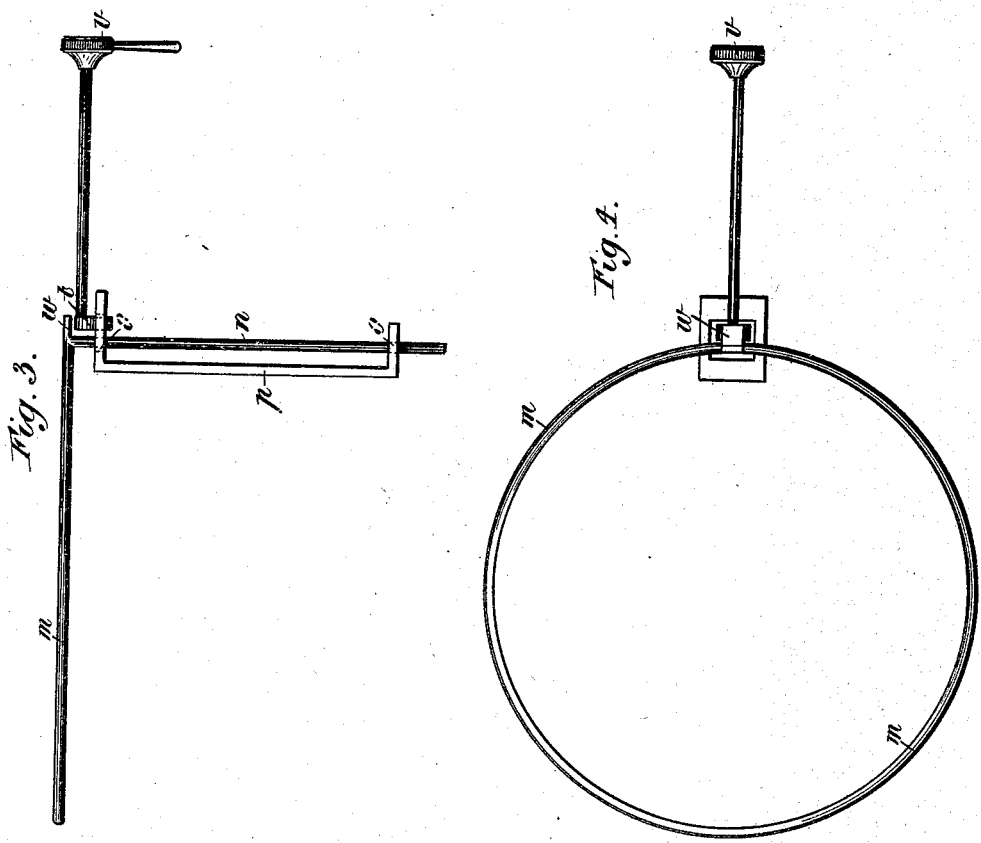

UNITED STATES PATENT OFFICE.

WILLIAM THOMSON, OF GLASGOW, COUNTY OF LANARK, SCOTLAND.

GALVANOMETER.

SPECIFICATION forming part of Letters Patent No. 416,655, dated December 3, 1889.

Application filed June 4, 1889. Serial No. 313,091. (No model.)

*To all whom it may concern:*

Be it known that I, Sir WILLIAM THOMSON, knight, of Glasgow, professor of natural philosophy in the University and College of Glasgow, in the county of Lanark, Scotland, have invented a Galvanometer, of which the following is a specification.

This invention relates to that class of electric-current meters, which depends for the measurement of the strength of currents on the action of a current passing through an insulated coil upon a magnetic needle supported in the center of the magnetic field of the coil, and has for its object, first, to provide more effective and delicate means for adjusting the several parts, whereby the measurements of the current's strength are made more accurate; and, second, to provide an independent magnet system for influencing the magnetic needle to avoid the difficulties arising from the dependence upon the earth's magnetism for the position of the needle.

My improvements consist, essentially, of a magnetic needle carrying an indicator-needle and supported so as to hang in the center of the magnetic field of a double electro-magnetic coil, and adjustable permanent magnets placed along the circumference of two horizontal circles having their axes coincident with the axis of the magnetic needle for the purpose of influencing the position of said needle. The whole is supported on suitable standards with adjustable thumb-screws for setting the several parts and other minor details, which will now be pointed out in the accompanying drawings. A checker is provided to facilitate quick reading of the indications.

Figure 1:
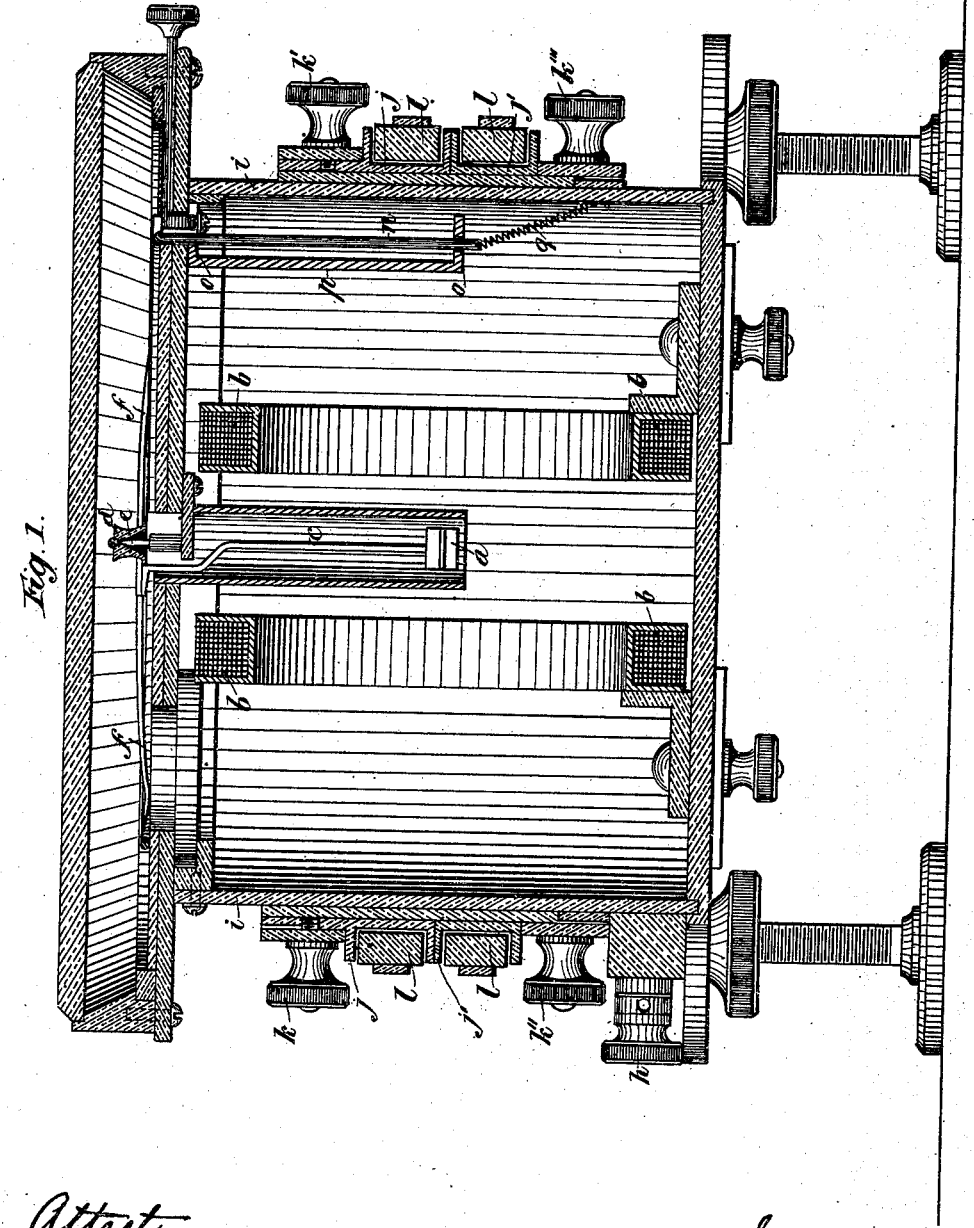
Figure 2:
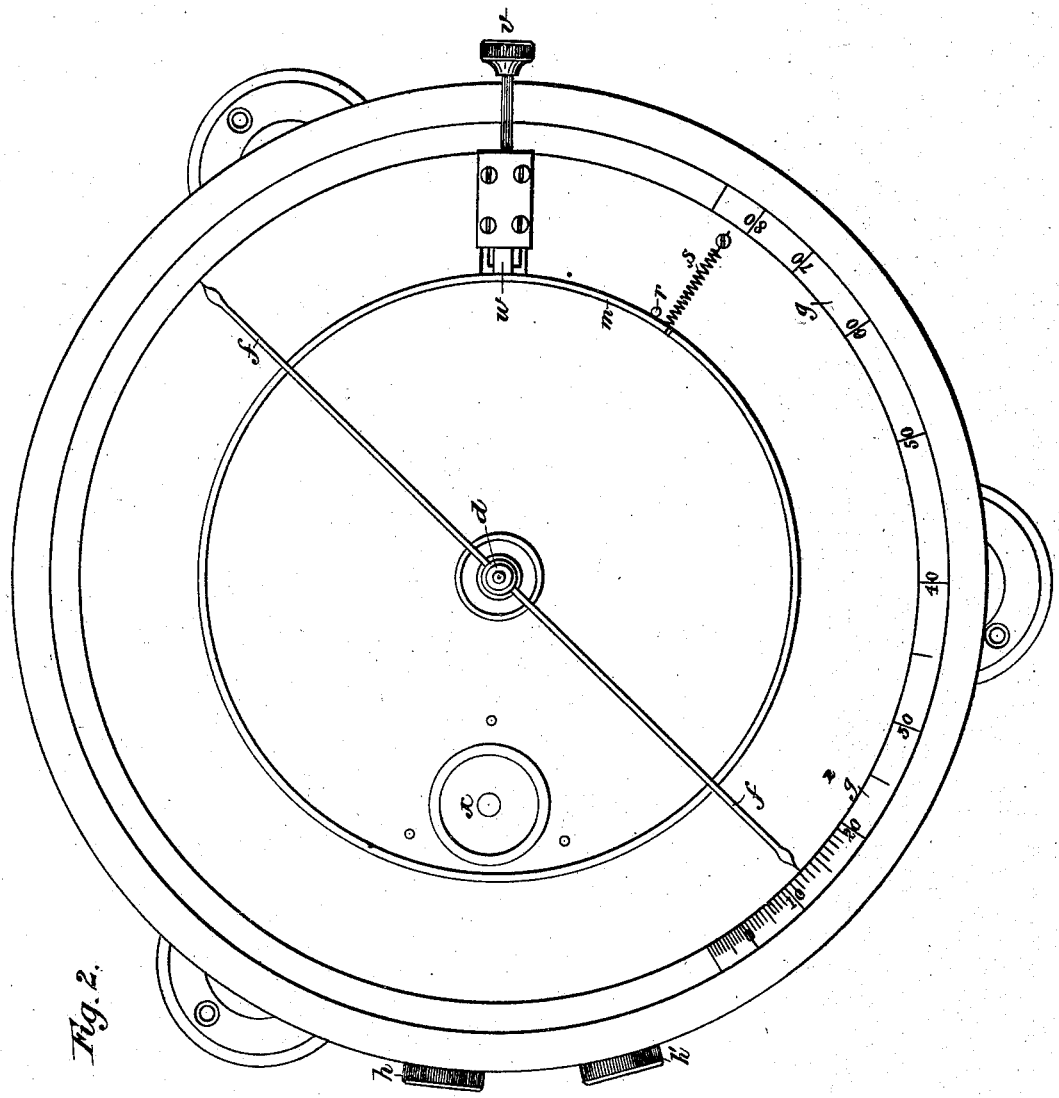

Figure 1 is a vertical section through the center at right angles to the plane of the electro-magnetic coil. Fig. 2 is a plan of the instrument. Figs. 3 and 4 are separate drawings of the checker, Fig. 3 being a plan, and Fig. 4 a vertical section.

Like letters of reference refer to like parts throughout.

The magnetic needle $a$ is suspended within a round guard-tube at the center of the magnetic field, due to the double electro-magnetic coils $b\ b$, by the bracket C, and the sapphire cap or cup $d$ resting upon the iridium point $e$. An indicator $f$, attached to the cap $d$, shows the deflection of the magnetic needle on a scale $g$, graduated according to tangents, so that differences of the numbers shown by the indicator on this scale are in simple proportion to different strengths of current through the coils. The terminals of the circuit of the coils are shown at $h\ h'$.

Surrounding the coil and magnet there is a cylindrical brass case $i$, upon which are fitted two annular frames $j\ j'$, each capable of independent azimuthal motion, and each having two pinching-nuts $k\ k'\ k''\ k'''$. Each of these frames carries a controlling-magnet $l$ in the space provided for it. Each of these controlling-magnets is in the form of a ring of rectangular section, and is in two halves, the halves being placed with like poles adjacent. The directive force of the magnets $l$ on the needle $a$ may be altered in magnitude by altering the relative azimuthal position of the poles of the two controlling-magnets, and may be altered in direction by turning both frames with their magnets simultaneously in azimuth. The scale $g\ g$ is adjustable in azimuth, so that when the magnets are set to bring the indicator to the middle of the scale (marked 40) equal currents in opposite directions shall give equal deflections. The position of the scale to fulfill these conditions must be found by trial, and when this position is found the scale is clamped by means of a clamping-screw provided for the purpose.

In ordinary use of the instrument the magnets are set to cause the indicator to stand at some such position, as 0, 10, or 20 of the scale, as shown in Fig. 2.

For checking the vibrations of the indicator, I use a rigid or elastic piece of solid material, which may be brought momentarily and gently to touch upon the indicator itself or other connected moving part of the apparatus.

To prevent all other motion of the checker than the one desired, I mount it in such a manner that the moving part of the checker is guided on five bearing-points, so arranged that the only motion allowable is in the required straight line.

The movable piece of solid material consists of a ring $m$, Figs. 2 3 4, of brass or other suitable metal, having its center in the axis, about which the indicator $f$ turns, and supported in a horizontal plane beneath the plane of motion of the indicator $f$ by means of a slide constructed as follows: A round vertical guide-rod $n$, in Figs. 1, 3, and 4, to which the ring $m$ is attached, passes through V-shaped openings $o\ o$ in the bracket $p$. Thus in virtue of gravity acting on the whole moving body $m\ n$, Figs. 3 and 4, with or without the addition of a spring $q$, pulling the vertical stem downward, the guide-rod is pressed into the upper and lower V-shaped openings $o\ o$. A small pin $r$, Fig. 2, is fixed in the plate touching the circumference of the ring $m$, which is kept pressed against the pin $r$ by a small spiral spring $s$. Thus the only motion possible to the movable body $m\ n$ is in a strictly vertical direction up or down, and this motion is given, when required, by means of a cam $t$, acting on a projecting lug $w$ and rotated by means of a handle $v$. The mechanism now last described, with reference to Figs. 3 and 4, as a vibration-checker for the indicator $f$ may be also, by obvious arrangements, used as a means of rendering the instrument to which it is applied readily portable. Thus it may be made to lift the whole movable body off the points of support and to clamp it securely against a fixed support. A spirit-level $x$, Fig. 2, is provided to show when the instrument is level.

I claim—

1. In a galvanometer, the combination of a magnetic needle suspended from an index between two electro-magnetic coils and a scale for indicating the angle of deflection, with two circular permanent magnets adjustable relatively to each other, whereby their controlling force is adjusted, as set forth.

2. In a galvanometer, the combination of the compound needle and controlling-magnets with the vibration-checker, which steadies the needle in its deflected position, as set forth.

3. In a vibration-checker for galvanometers, the combination of the ring $m$, situated beneath the index inside the scale, and a supporting-rod attached to one side of said ring and held in suitable sockets, with a lug attached to the ring and suitable operating mechanism for raising and lowering the ring as desired, as set forth.

In witness whereof I have hereunto set my hand in the presence of two witnesses.

WILLIAM THOMSON.

Witnesses:
W. BOTTOMLEY,
JOHN LIDDLE,
Both of 154 St. Vincent Street, Glasgow.